(Model.)
L. G. LANGE.
INJECTOR.
No. 409,046. Patented Aug. 13, 1889.
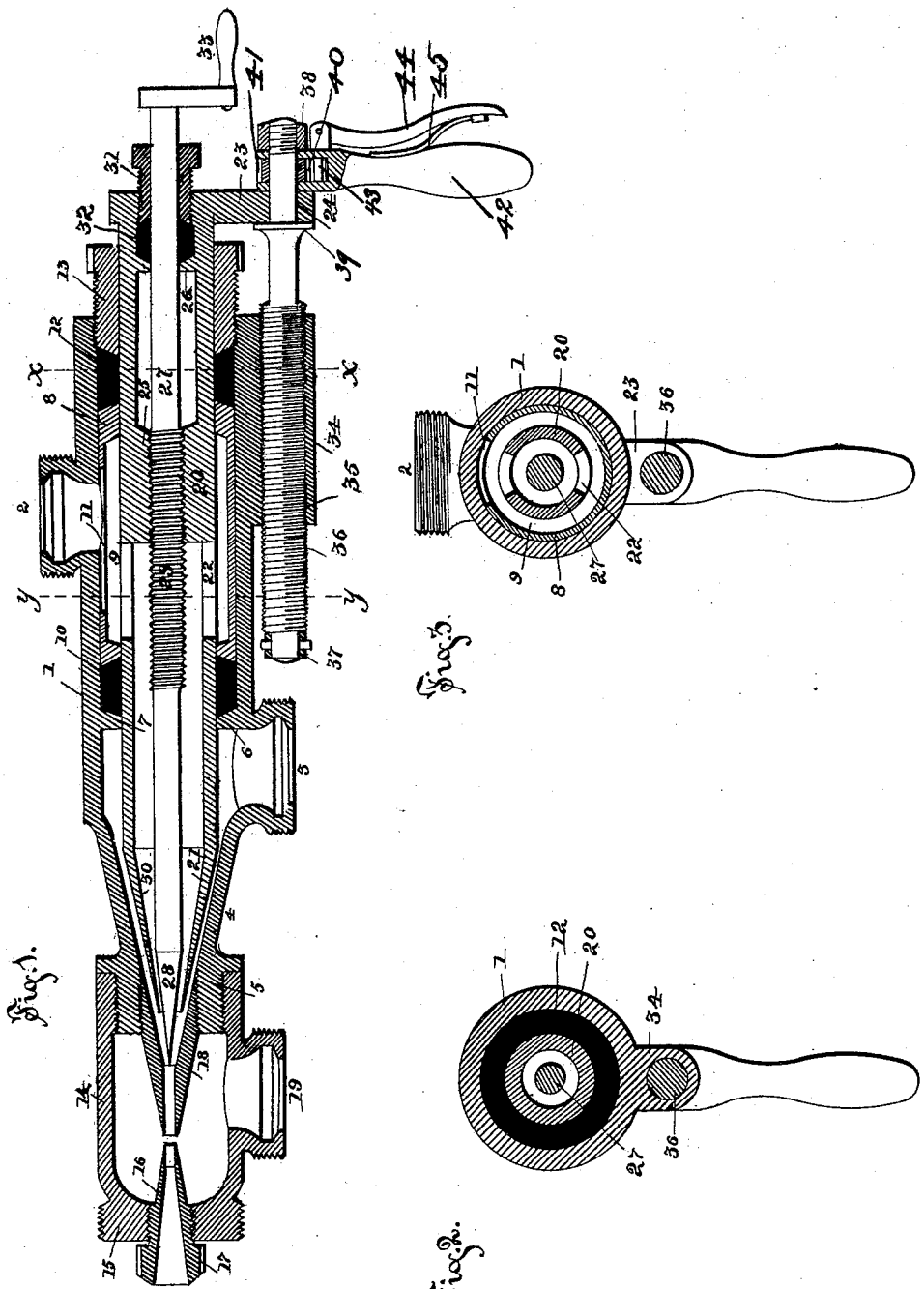

UNITED STATES PATENT OFFICE.

LARS G. LANGE, OF CANNON RIVER FALLS, MINNESOTA.

INJECTOR.

SPECIFICATION forming part of Letters Patent No. 409,046, dated August 13, 1889.

Application filed July 16, 1888. Serial No. 280,059. (Model.)

*To all whom it may concern:*

Be it known that I, LARS G. LANGE, a citizen of the United States, and a resident of Cannon River Falls, in the county of Goodhue and State of Minnesota, have invented certain new and useful Improvements in Injectors; and I do hereby declare that the following is a full, clear, and exact description of the invention, which will enable others skilled in the art to which it appertains to make and use the same, reference being had to the accompanying drawings, which form a part of this specification, and in which—

Figure 1 is a longitudinal sectional view of my improved injector for steam-boilers. Fig. 2 is a cross-section on line $x$ $x$, Fig. 1; and Fig. 3 is a similar view on line $y$ $y$, same figure.

Similar numerals of reference denote corresponding parts in the several figures.

My invention has relation to injectors for forcing water into steam-boilers by a jet of steam which is controlled by an adjustable valve-rod.
To this end the invention consists in the improved construction and combination of parts of the same which will be hereinafter set forth.

In the accompanying drawings, the numeral 1 indicates a cylindrical outer casing, having an opening or connection 2 near its rear end, at its upper side, for the attachment of the steam-pipe, and a similar opening or connection 3 near the forward end, at its under side, for the attachment of the water-pipe. The casing is formed at its forward end with a conical projection 4, terminating in an interiorly and exteriorly screw-threaded enlargement 5, and is further formed with (on its inner side, to the rear of the water-inlet) an annular shoulder 6, formed by the annular rib 7. A sleeve 8, having a recess 9 in its inner side, fits within the casing, and has its forward end bearing against a packing 10, interposed between it and the annular rib 7, the recess extending around the entire inner side of the sleeve, and having a longitudinal slot 11 registering with the steam-inlet in the casing, and a packing 12 is placed against the rear end of this sleeve, and has the inner end of a packing sleeve or collar 13 screwed into the rear end of the casing and bearing against it.

A cylindrical extension 14 is screwed upon the outer side of the threaded enlargement of the casing 1, and has an interiorly and exteriorly screw-threaded neck 15, by means of which neck it may be secured to the boiler-shell. A nozzle 16, having a conical bore, is screwed with its rear exteriorly-threaded portion in the interiorly-threaded portion of the enlargement 5, and has formed upon its exterior forward portion a nut 17, by means of which it may be easily screwed in position. The forward end of this nozzle projects into the cylindrical extension and registers with a similar nozzle 18, which is secured in the neck of the extension, which is formed on its under side with an escape opening or connection 19.

A tube 20 fits within the sleeves and packing-rings of the casing, and is formed with a forwardly-tapering forward end 21 and with an annular series of perforations 22, which register with the inner recess of the sleeve, and the rear end of this tube is provided with a downwardly-projecting arm 23, formed with an aperture 24 in its end. The interior portion of this sleeve is provided with an annular screw-threaded rib 25 to the rear of the annular series of perforations, and with an annular rib 26 near the rear end, and a valve-rod 27, having a tapering forward end 28 and a screw-threaded portion 29, fits and turns with the said threaded portion in the screw-thread rib and with its tapering end in a tapering seat 30, formed in the forward end of the tube. The rear end of the rod is journaled in a packing-sleeve 31, which has its forward end bearing against a packing 32 between the sleeve and the annular rib at the rear end of the tube, and the extreme rear end of the rod is provided with a wheel or crank having a suitable handle 33 for turning it.

A rib 34 projects from the under side of the rear end of the casing, and is formed with a longitudinal threaded aperture 35, within which a threaded stem 36 turns, the said stem having its rear end journaled in the perforation of the downwardly-projecting arm of the tube within the casing, and having nuts 37 and 38, respectively, upon the rear and forward ends.

The stem is formed with a shouldered portion 39, which bears against the arm 23, and a ratchet portion 40 is formed between this shouldered portion and the bearing in the arm, the said ratchet portion being inclosed in a perforated head 41 of a handle or lever 42, having a pawl 43, which engages the teeth of the ratchets, and which is provided with a handle 44, projecting at the side of the lever and forced out from the same by a spring 45.

When the injector is to be used, the screw-threaded valve-rod is screwed back to form an opening between the tapering forward end and the seat in the forward end of the tube, when the steam will pass through its inlet and through the slot in the sleeve, and thence through the perforations of the tube, forming a jet at the forward end of the tube, which will form a vacuum within the chamber or nozzle at the forward end of the casing, and when the ratchet-handle is turned, revolving the stem, the tube may be drawn rearward, allowing the water to be drawn up through the water-inlet and injecting it into the boiler in the usual manner. The escape opening or connection 19 will permit the excess of steam or water caused from the want of proper adjustment of the device to escape.

It will be seen that the quantity of steam admitted into the injector may be governed by the adjustment of the threaded valve-rod within the tube, which may be operated by means of the crank or hand wheel upon its end.

It will be seen that by securing the nozzle 16 removably to the forward end of the casing others with larger bores may be employed when desired.

When the packing-rings become worn or compressed by usage, the several parts of the device which bear against these rings may be screwed more firmly together, or in other words, until they impinge upon the rings.

I am aware that a central pipe passing down through the center of the nozzles of ejectors or condensers or ejector-condensers has been used prior to my invention, and that the application of an ejector in substitution of an air-pump for withdrawing water, air, and uncondensed vapor from steam-engine condensers or other chambers is not broadly new in this connection, and I do not broadly claim either herein.

Having thus described my invention, I claim and desire to secure by Letters Patent of the United States—

The herein-described injector, consisting of the casing having inlet and outlet depending rib and threaded end, the extension connected to said threaded end carrying a conical nozzle and having an escape-opening, the tube provided with openings arranged in the casing and having a depending arm at one end, the stem in the tube, the stem passing through the rib and arm of the casing and tube, the handle connected to said stem, and the pawl and ratchet, said parts being arranged and adapted to serve substantially as and for the purpose described.

In testimony that I claim the foregoing as my own I have hereunto affixed my signature in presence of two witnesses.

LARS G. LANGE.

Witnesses:
CHAS. PARKS,
J. E. FALCK.